US006988687B2

(12) United States Patent  
Huang

(10) Patent No.: US 6,988,687 B2  
(45) Date of Patent: Jan. 24, 2006

(54) MOUSE CABLE REWIND APPARATUS

(76) Inventor: Chien-Pin Huang, 7F, #15, Lane 222, Tun Hua N. Rd., Taipei (TW)

( * ) Notice: Subject to any disclaimer, the term of this patent is extended or adjusted under 35 U.S.C. 154(b) by 152 days.

(21) Appl. No.: 10/726,663

(22) Filed: Dec. 4, 2003

(65) Prior Publication Data

US 2004/0169106 A1    Sep. 2, 2004

(30) Foreign Application Priority Data

Feb. 27, 2003   (TW) ............................... 92203095 U

(51) Int. Cl.
B65H 75/48    (2006.01)
G09G 5/08    (2006.01)
(52) U.S. Cl. .................... 242/385; 242/379; 345/163
(58) Field of Classification Search ............ 242/378.4, 242/379, 385, 385.2; 191/12.2 R, 12.4; 345/157, 345/162–165, 167; 361/600, 683, 686
See application file for complete search history.

(56) References Cited

U.S. PATENT DOCUMENTS

| 5,655,143 A  * | 8/1997 | Alpert et al. ............... 361/600 |
| 5,670,989 A  * | 9/1997 | Owen ......................... 345/163 |
| 6,088,021 A  * | 7/2000 | Yong .......................... 345/163 |
| 6,304,249 B1 * | 10/2001 | Derocher et al. .......... 345/163 |
| 6,392,635 B1 * | 5/2002 | Snyder ....................... 345/163 |
| 6,421,044 B2 * | 7/2002 | Murphy ...................... 345/163 |
| 6,738,046 B2 * | 5/2004 | Chung ........................ 345/163 |
| 2003/0184521 A1 * | 10/2003 | Sugita ........................ 345/163 |

FOREIGN PATENT DOCUMENTS

| JP | 5-303469 | * 11/1993 |
| JP | 8-30386 | * 2/1996 |
| JP | 10-222300 | * 8/1998 |
| JP | 2001-67181 | * 3/2001 |
| JP | 2001-310502 | * 11/2001 |
| JP | 2004-272868 | * 9/2004 |

* cited by examiner

Primary Examiner—William A. Rivera  
(74) Attorney, Agent, or Firm—Troxell Law Office, PLLC

(57) ABSTRACT

The invention relates to a mouse cable rewind apparatus having an upper cover, a protection disc, an upper winding disc, a lower winding disc, a cable, a support plate and a lower cover. The upper winding disc and the lower winding disc are attached to each other and disposed within a receiving groove of the upper cover that is connected with the lower cover. A cable head cap of the lower cover is opened to take out the cable head for rapidly extending the cable at a certain length while the cable is rapidly rewound as well by use of a spring and a regulating member. Moreover, a rewinding device is available for attenuating the winding and pulling force on the cable end that is spot-welded on a circuit board and for preventing the strands inside of the conventional mouse cable from being subject to break due to the oxidation of the cable sheathing and the frequent and rapid pull of the cable.

5 Claims, 10 Drawing Sheets

MOUSE CABLE REWIND APPARATUS

BACKGROUND OF THE INVENTION

1. Field of the Invention

The invention relates to a mouse cable rewind apparatus, and more particularly, to a device for attenuating the winding and pulling force on the cable end spot-welded on a circuit board and for preventing the strands inside of the mouse cable from being subject to break due to the oxidation of the cable sheathing and the frequent and rapid pull of the cable.

2. Description of the Related Art

As shown in the FIGS. 1 and 2, a conventional mouse cable rewind apparatus includes a shaft 100, a spring 200, an engaging member 300, a cable rewind disc 400, a top cover 500 and a bottom cover 600. The shaft 100 is positioned at the front side of the bottom cover 600. The spring 200 is mounted on the shaft 100. The cable 401 is wound onto the cable rewind disc 400. Moreover, one end of the cable 401 is downwardly pulled for being spot-welded on a circuit board. Thereafter, the cable rewind disc 400 is fixed on the spring 200. The cable rewind disc 400 is rewindable with respect to the spring 200 due to the resilience of the spring 200. An engaging piece 402 is disposed on the bottom surface of the cable rewind disc 400. The engaging member 300 is fixed on the bottom cover 600. The engaging member 300 is engaged into an indentation 4021 of the engaging piece 402 in position. Moreover, the mouse is covered with the top cover 500, and the assembly of the mouse is completed.

In use, the cable 401 is pulled out of the mouse at a desired length and engaged in position. In rewinding the cable 401, the engaging member 300 is disengaged from the indentation 4021 and the cable 401 is rewound into the mouse by use of the resilience of the spring 200.

However, the strands inside of the conventional mouse cable is subject to break due to the oxidation of the cable sheathing and the frequent and rapid pull-out action of the cable.

SUMMARY OF THE INVENTION

In light of the demerits of the prior art, the invention provides a mouse cable rewind apparatus that aims to ameliorate at least some of the disadvantages of the prior art or to provide a useful alternative.

A primary objective of the invention is to provide a mouse cable rewind apparatus an upper cover, a protection disc, an upper winding disc, a lower winding disc, a cable, a support plate and a lower cover. The upper winding disc and the lower winding disc are attached to each other and disposed within a receiving groove of the upper cover that is connected with the lower cover. A cable head cap of the lower cover is opened to take out the cable head for rapidly extending the cable at a certain length while the cable is rapidly rewound as well by use of a spring and a regulating member. Moreover, a rewinding device is available for attenuating the winding and pulling force on the cable end spot-welded on a circuit board and for preventing the strands inside of the conventional mouse cable from being subject to break due to the oxidation of the cable sheathing and the frequent and rapid pull of the cable.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
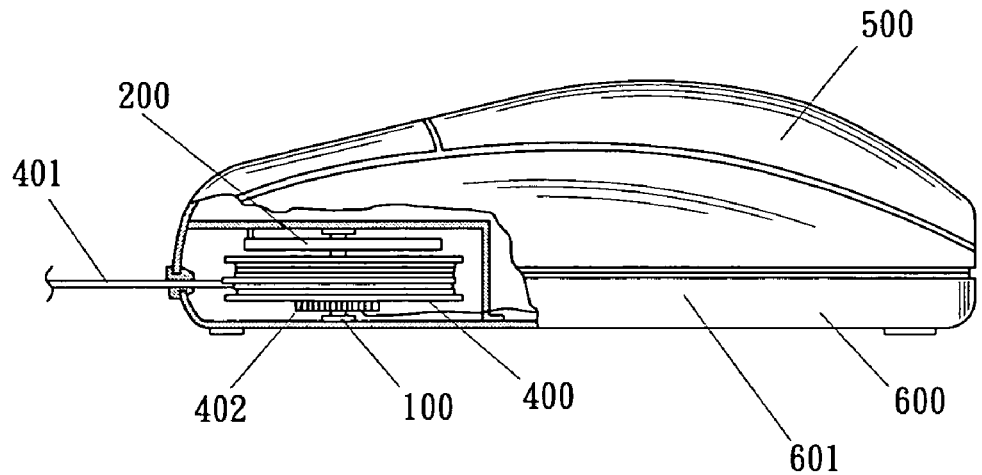
FIG. 1 is a sectional side view of a conventional mouse cable rewind apparatus.
Figure 2:
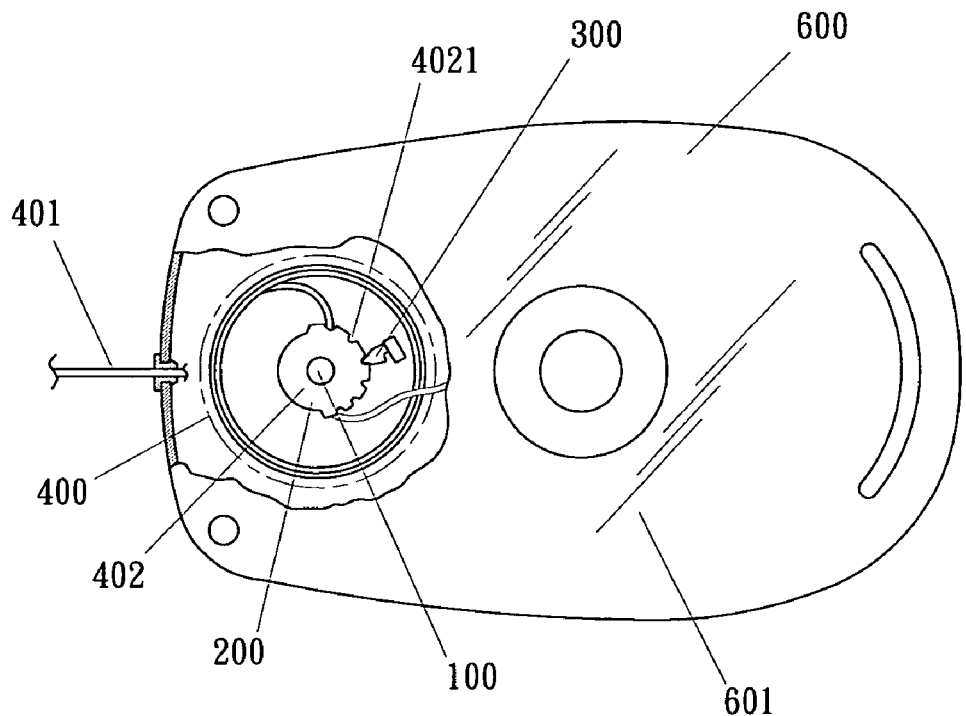
FIG. 2 is a sectional bottom view of the conventional mouse cable rewind apparatus.
Figures 3, 3A:
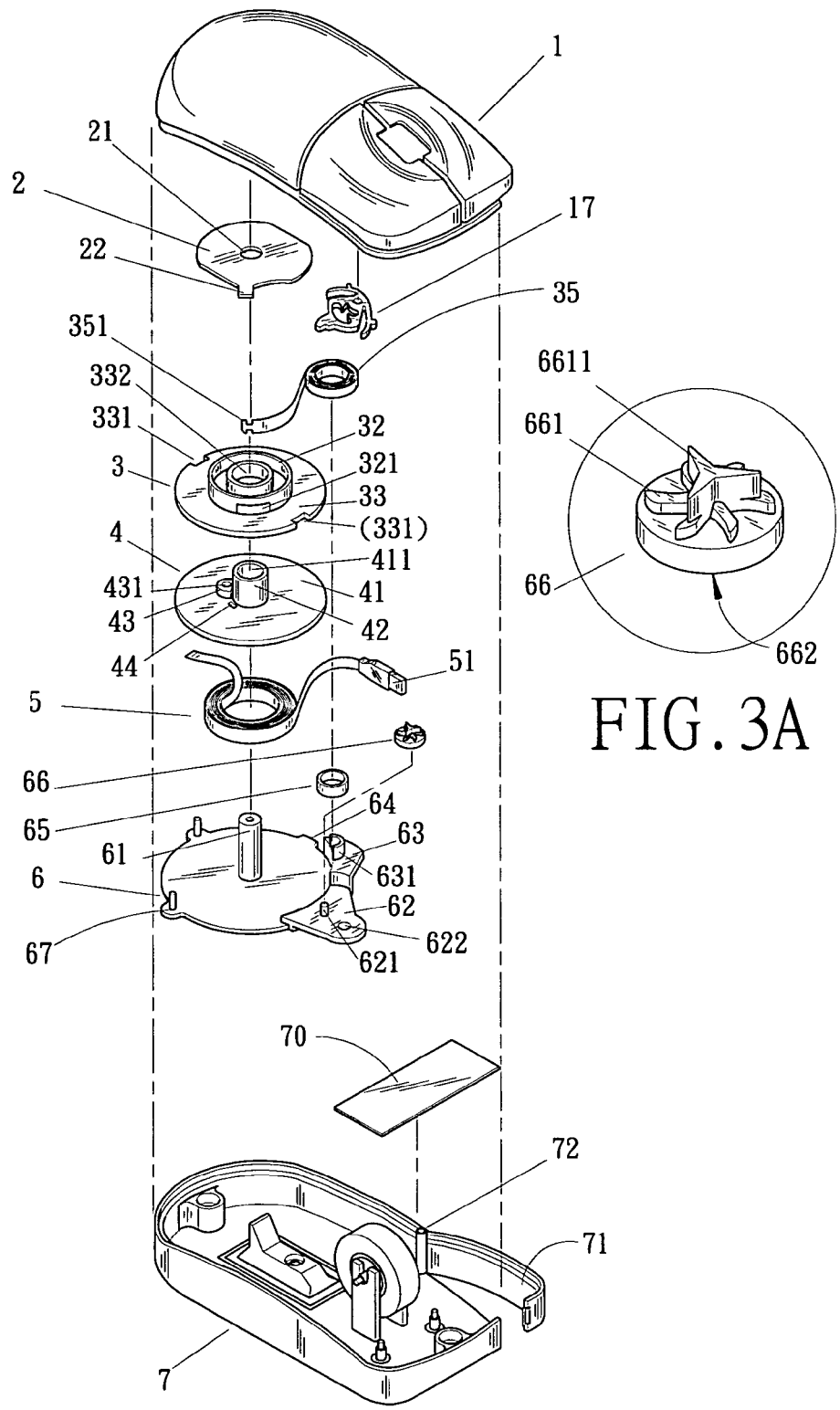
FIG. 3 is an exploded top view of the mouse cable rewind apparatus of the invention.
FIG. 3A is an enlarged view of the tooth seat of the invention.
Figure 4:
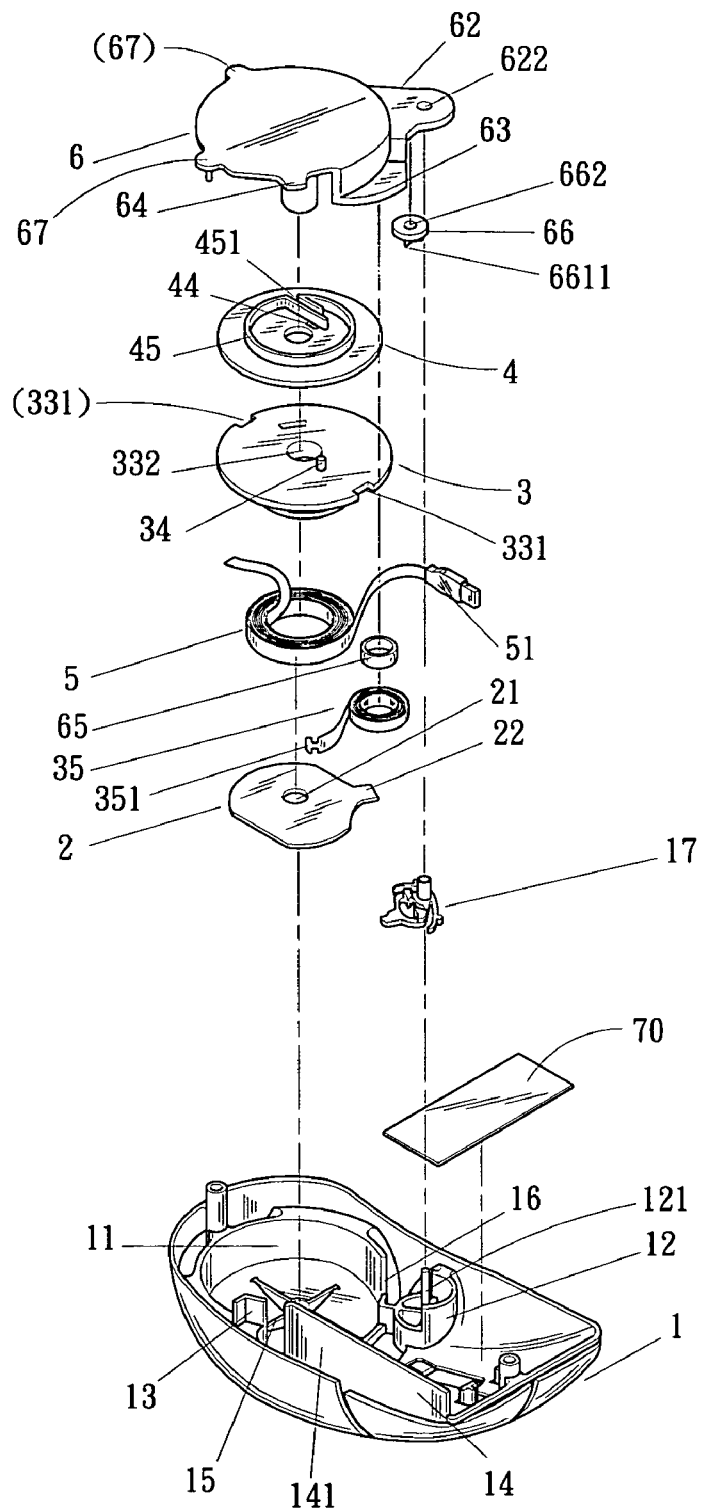
FIG. 4 is an exploded bottom view of the mouse cable rewind apparatus of the invention.
Figure 5:
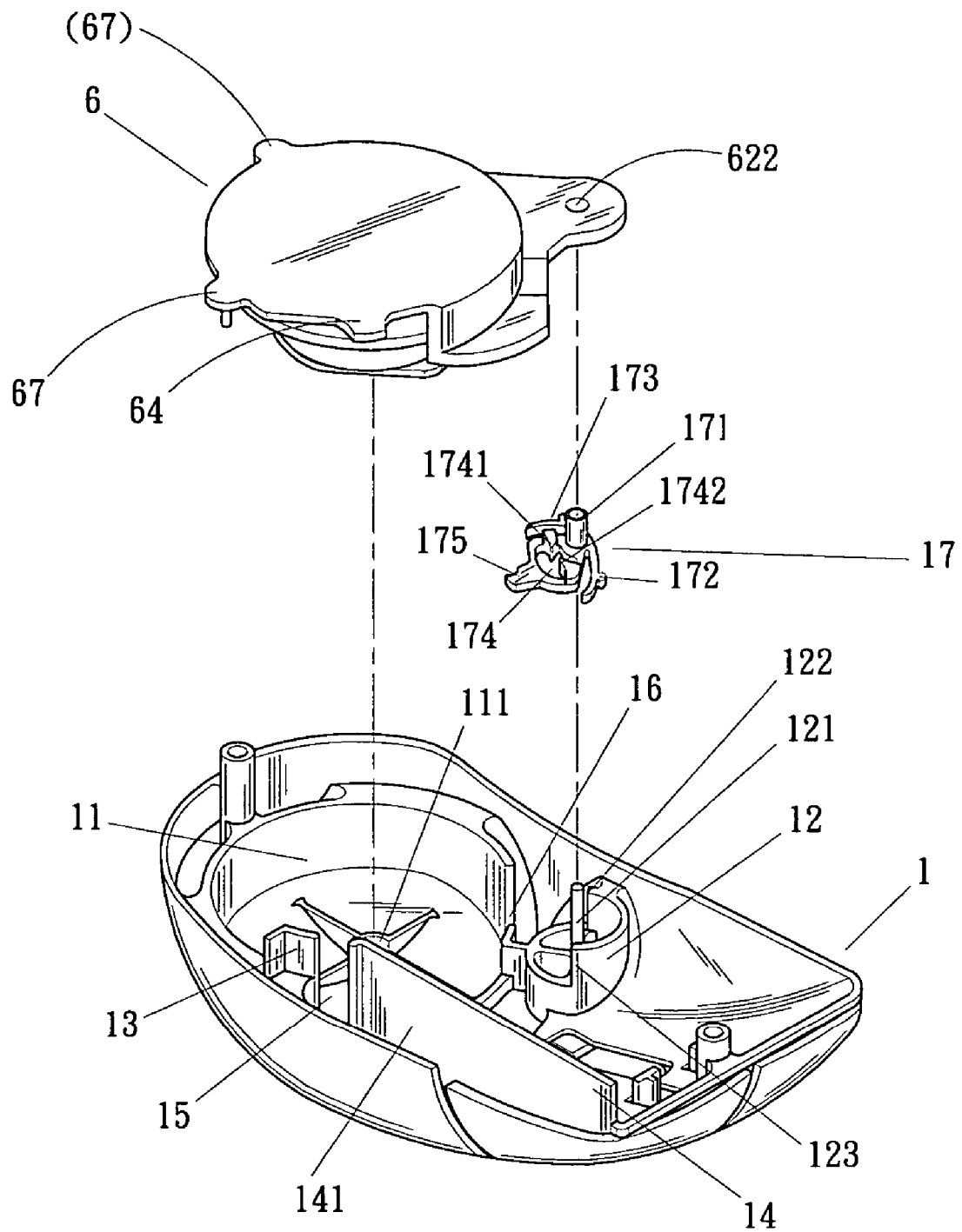
FIG. 5 is an exploded view of the assembly of the winding portion and the regulating portion of the invention.
Figure 6:
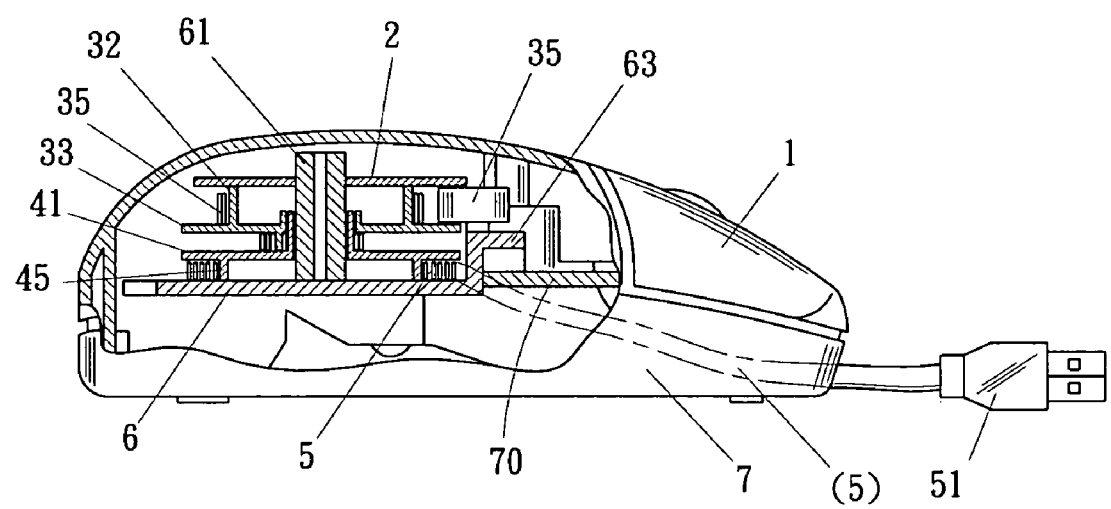
FIG. 6 is a sectional view of the mouse cable rewind apparatus of the invention.

First of all, referring to FIGS. 3 and 4, the mouse cable rewind apparatus in accordance with the invention includes an upper cover 1, a protection disc 2, an upper winding disc 3, a lower winding disc 4, a cable 5, a support plate 6 and a lower cover 7. The upper cover 1, as shown in FIG. 5, is formed in concave oval shape and includes at its rear side a receiving groove 11 with a single opening. Besides, a shaft socket 111 is disposed at the center of the receiving groove 11. An engaging groove 16 is formed at the opening of the receiving groove 11 while a tube-shaped regulating seat 12 is slightly spaced apart from the engaging slot 16. The rear semicircular wall of the regulating seat 12 extends upwards and forms two counteracting parts 122, 123 at its both sides, respectively. In addition, an upright post 121 is disposed at a center that is enclosed by the semicircular wall of the regulating seat 12. An end stop 13 is located at the place where the semicircular wall of the regulating seat 12 leads into the opening. At the same side of the end stop 13, a partition 14 is provided in the front part of the upper cover 1. The partition 14 is separated from the end stop 13 by an engaging slot 15. Meanwhile, an elongated groove 141 is formed between the partition 14 and the side wall of the upper cover 1. Two engaging pieces 64, 22 are insertable into the engaging slots 15, 16, respectively, for receiving the cable head 51 of the cable 5.

The regulating member 17 is a hook body in an irregular shape having a regulating tube 171 at its rear end. Two resilient pieces 172, 173 are disposed on both sides of the basis of the regulating tube 171. Besides, the center of the regulating member 17 is bored with an oval tooth hole 174 having two raised insertion hooks 1741, 1742 at both sides thereof. Moreover, an engaging protrusion 175 is extended from the front part of the regulating member 17.

The protection disc 2 is a flat piece in an oval shape with a shaft hole 21 at the center thereof. An engaging piece 22 is extended from one side of the protection disc 2.

The upper winding disc 3 includes an upper protrusion ring 32 concentrically positioned on the surface 33. A spring hole 321 is formed in the wall of the upper protrusion ring 32. The flat surface 33 is bored with a shaft hole 332 within the upper protrusion ring 32. Moreover, two corresponding engaging grooves 331 are formed at the rim of the flat surface 33. An insertion protrusion 34 is positioned on the reverse side of the upper winding disc 3 and near the shaft hole 332 of the flat surface 33.

The lower winding disc 4 includes a round tube 42 having a slightly smaller diameter than the upper protrusion ring 32 and extending upwardly from the center of a flat surface 41 thereof into the shaft hole 332. A semicircular protrusion 43 with an insertion hole 431 at the center thereof is mounted at the rim of the round tube 42. Moreover, the lower winding disc 4 includes a lower protrusion ring 45 and a cable inserting gap 44 on the back side thereof. In addition, a cable clamping groove 451 is formed within the lower protrusion ring 45.

In assembly of the upper winding disc 3 with the lower winding disc 4, the upper protrusion ring 32 of the upper winding disc 3 is mounted on the round tube 42 of the lower winding disc 4 while the insertion protrusion 34 of the upper winding disc 3 is inserted into the insertion hole 431 of the lower winding disc 4. A spring 35 is realized as a coil spring having a hook end 351 for insertion into the spring hole 321. The cable 5 includes a cable head 51. The support plate 6 is roughly a round flat plate and includes a rotating shaft 61 standing uprightly at the center thereof. A laying plate 62 is raised and extended from one side of the support plate 6. The laying plate 62 converges in radial direction into a semicircular end. Moreover, the laying plate 62 is provided with a positioning post 621 near the center thereof and a regulating hole 622 somewhere in the laying plate 62. A laying base 63 is raised at one side of the laying plate 62, and the bottom thereof is connected with the support plate 6. A semicircular spring post 631 is disposed on the laying base 63. Moreover, a plurality of evenly spaced engagement pieces 64 are arranged at the outer rim of the support plate 6. A sleeve 65 is so constructed that it can be mounted just on the spring post 631 for operating the spring 35 and reducing the wearing action. The tooth seat 66 is a cylindrical body and includes six evenly spaced lower blade teeth 661 on which three upper taper teeth 6611 lie. Meanwhile, the tooth seat 66 is bored with a tooth seat hole 662 at the center of the bottom thereof. As shown in FIG. 3, the lower cover 7 is roughly in oval shape and includes at the same side corresponding to the elongated groove 141 a cable head cap 71 rotatably connected by a pivot 72 to the side thereof for closing the cable head 51 within the mouse.

With reference to FIGS. 3, 4, 5, 6 and 8, the assembly of the upper winding disc 3 and the lower winding disc 4 are shown. On the one hand, one end of the cable 5 passes upwardly through the cable inserting gap 44 of the lower winding disc 4. After the cable 5 is pulled out at a certain length, this portion of the cable 5 is fixed on the semicircular protrusion 43 and wound around the round tube 42 and the semicircular protrusion 43. Then, this cable end is spot-welded on a circuit board. The other portion of the cable 5 is clamped within the cable clamping groove 451 and wound around the lower protrusion ring 45 that is then mounted on the rotating shaft 61 of the support plate 6. On the other hand, the hook end 351 of the spring 35 is hooked in the spring hole 321. After the spring 35 is wound around the upper protrusion ring 32 for a few loops, the rest of the spring 35 is mounted on the spring post 631. By use of the created resilient force on the support plate 6, the sleeve 65 is mounted on the spring post 631 for preventing from scrapes caused by too large friction between the spring 35 and the spring post 631. Thereupon, the tooth seat 66 with the tooth seat hole 662 is mounted on the positioning post 621 of the support plate 6. Meanwhile, the insertion hooks 1741, 1742 of the regulating member 17 are meshed with the upper taper teeth 6611 of the tooth seat 66. Moreover, the protection disc 2 is mounted on the rotating shaft 61 of the support plate 6 and so adjusted that all components are not scattered away due to the vibration caused by external forces. Then, the regulating tube 171 of the regulating member 17 is mounted on the upright post 121 of the regulating seat 12 while the engagement pieces 64, 22 are engaged into the engaging slots 15, 16 of the upper cover 1. In addition, they are aligned with the tooth hole 174 and the tooth seat 66 for achieving the adjusting effect. At last, they are attached to the lower cover 7 by clamping forces.

In use, the cable head cap 71 of the lower cover 7 is opened to remove the cable head 51. While the cable head 51 is pulled out, the cable 5 is rapidly unwound by means that the assembled upper and lower winding disc 3, 4 rotated on the rotating shaft 61. Moreover, by use of the restoring force of the spring 35 and by means of the engaging adjustment of the tooth seat 66 and the tooth hole 174, the cable 5 is rapidly rewound. Consequently, the cable 5 is freely rewindable and unwindable.

Figure 7A:
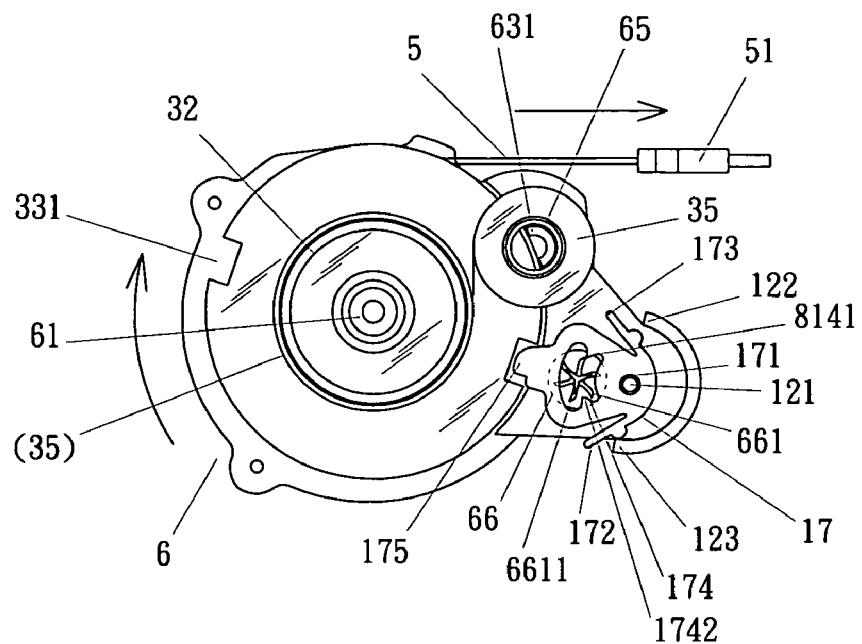
FIG. 7A is a first schematic drawing of the mouse cable rewind apparatus of the invention, showing that the cable is unwound.
Figure 7B:
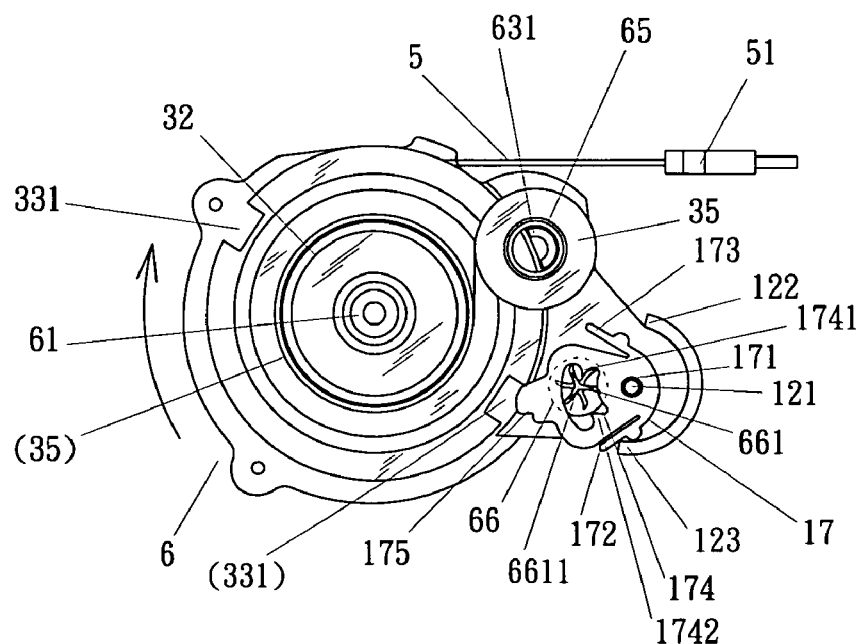
FIG. 7B is a second schematic drawing of the mouse cable rewind apparatus of the invention, showing that the cable is unwound.
Figure 7C:
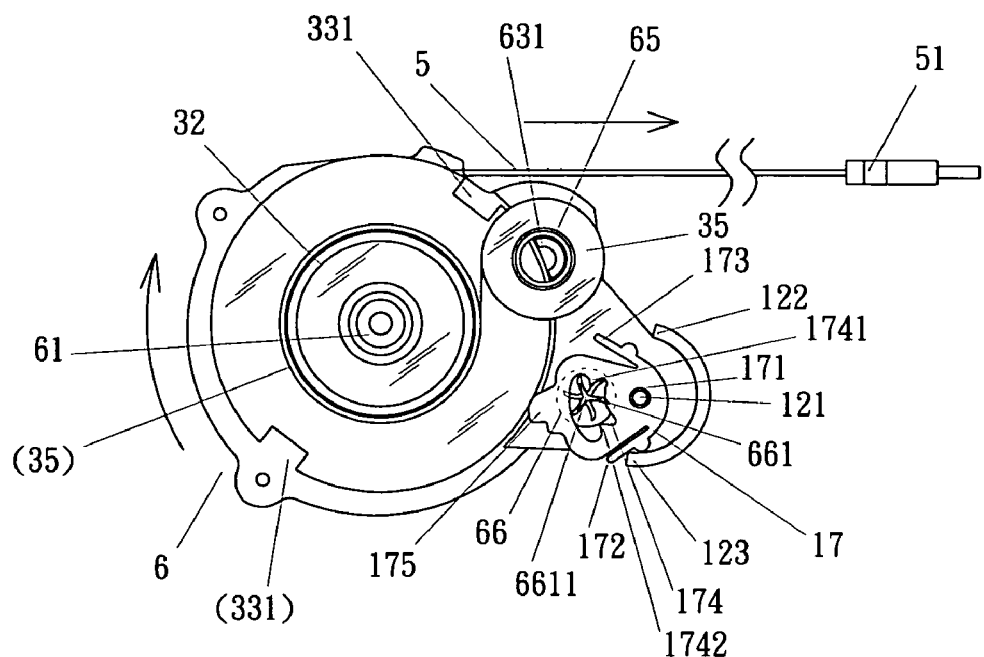
FIG. 7C is a third schematic drawing of the mouse cable rewind apparatus of the invention, showing that the cable is unwound.
Figure 7D:
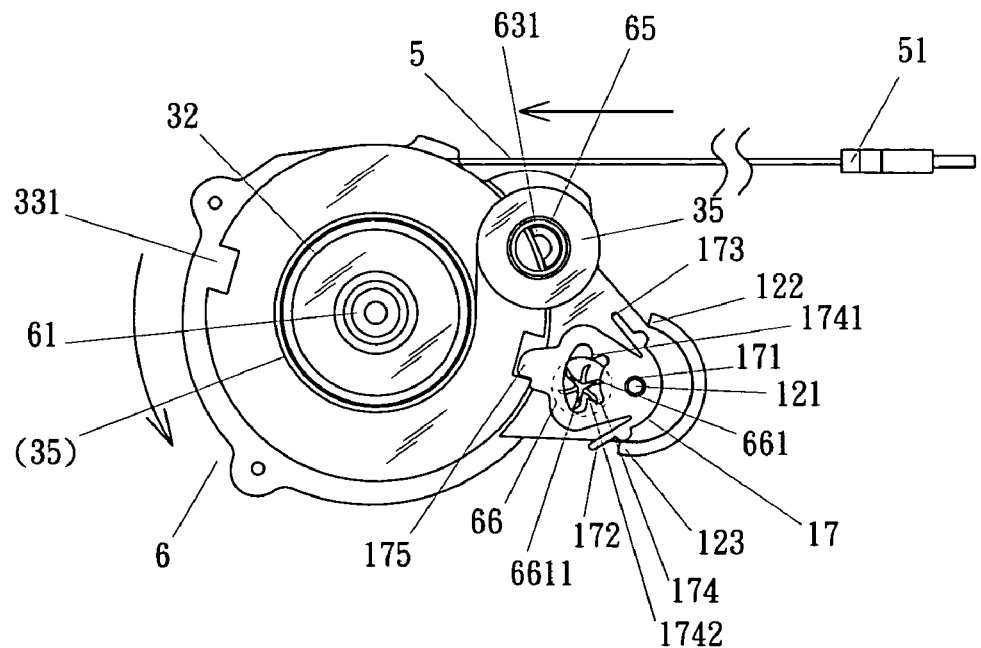
FIG. 7D is a first schematic drawing of the mouse cable rewind apparatus of the invention, showing that the cable is rewound.
Figure 7E:
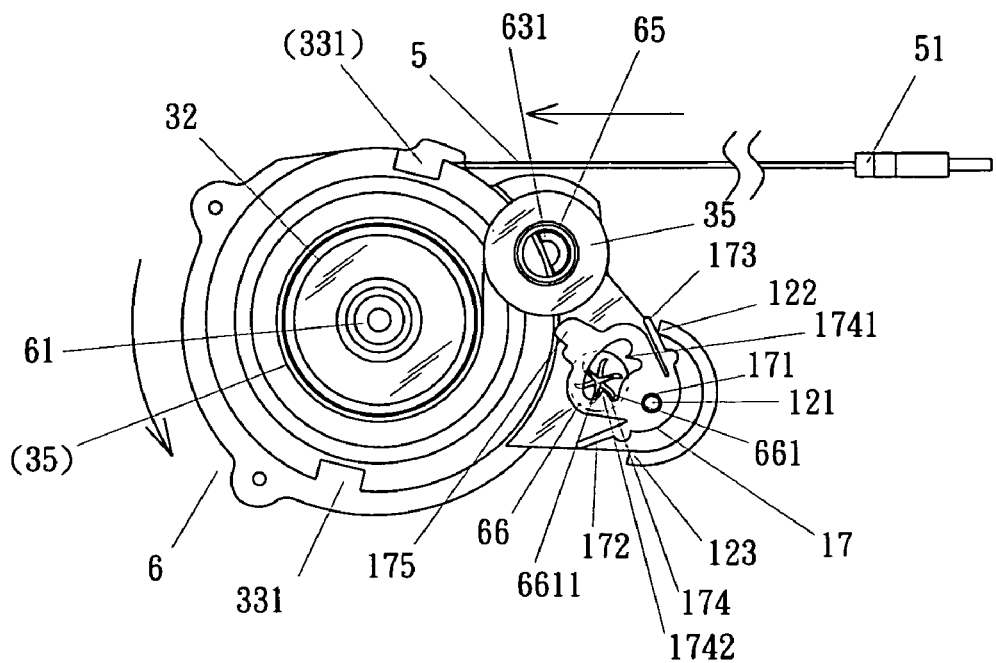
FIG. 7E is a second schematic drawing of the mouse cable rewind apparatus of the invention, showing that the cable is rewound.
Figure 8:
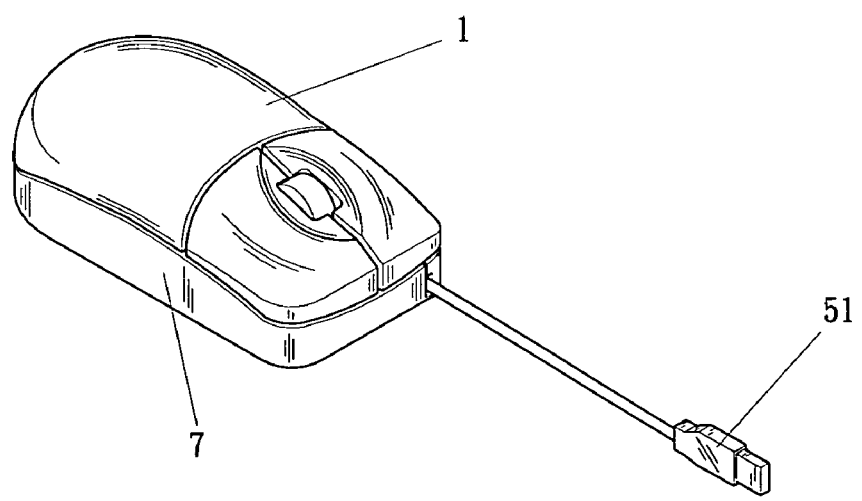
FIG. 8 is a perspective view of the mouse cable rewind apparatus of the invention.
Figure 9A:
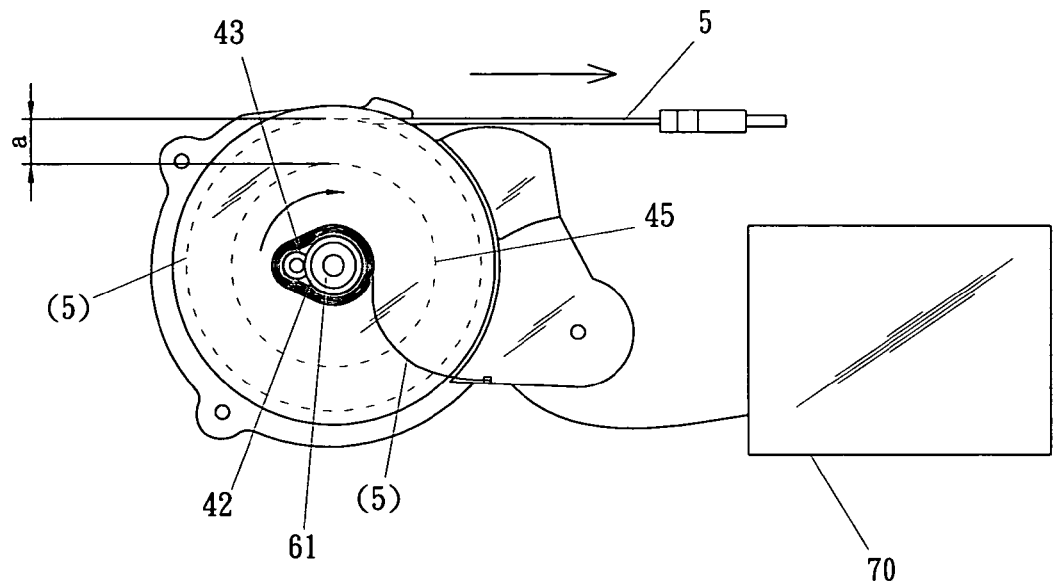
FIG. 9A is a first schematic drawing of the mouse cable rewind apparatus of the invention, showing how the pulling force on the cable is counteracted.
Figure 9B:
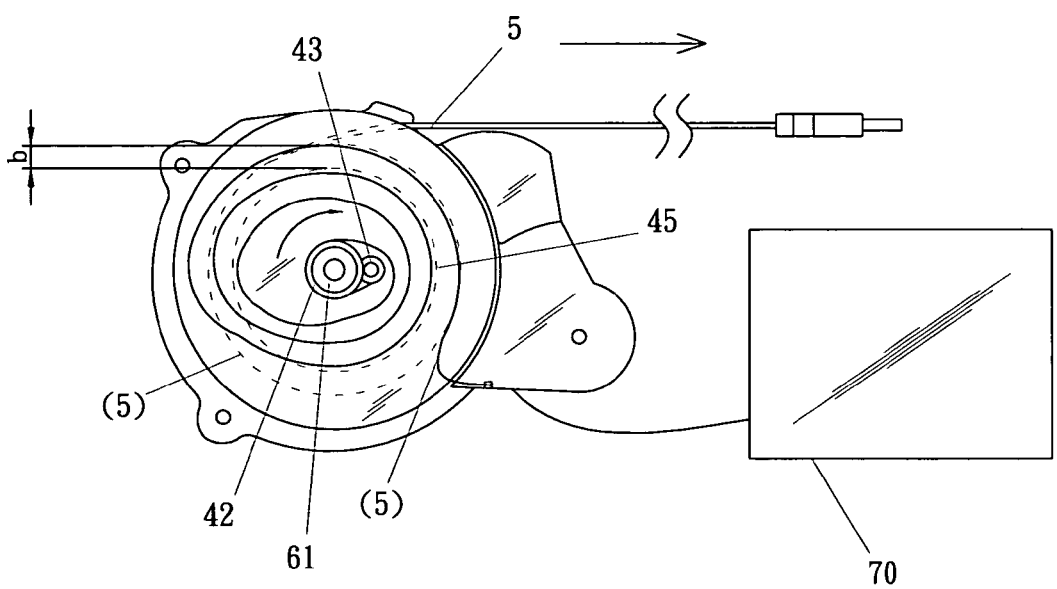
FIG. 9B is a second schematic drawing of the mouse cable rewind apparatus of the invention, showing how the pulling force on the cable is counteracted.
Figure 9C:
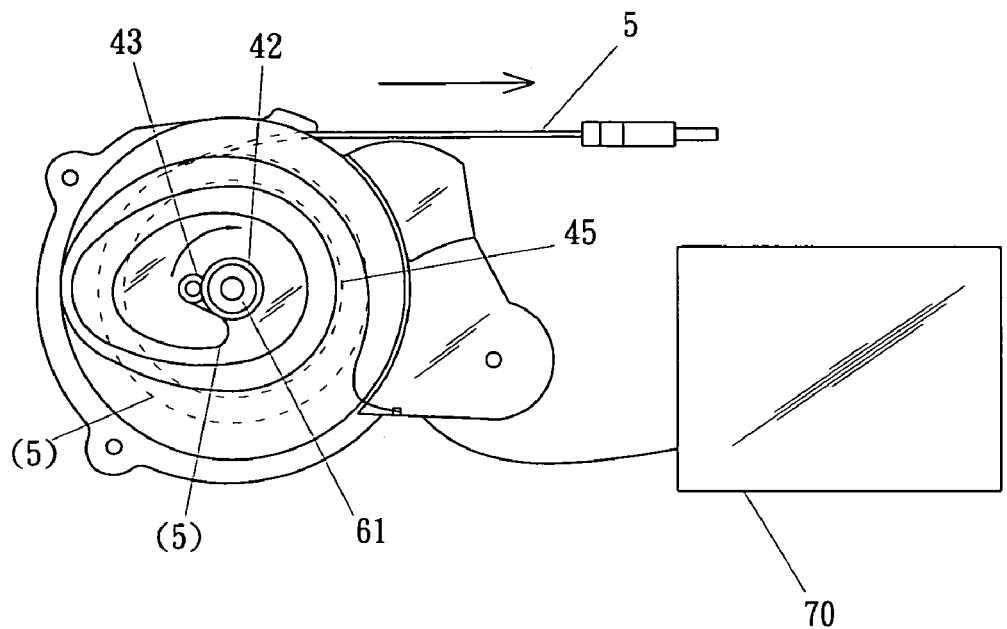
FIG. 9C is a third schematic drawing of the mouse cable rewind apparatus of the invention, showing how the pulling force on the cable is counteracted.
Figure 9D:
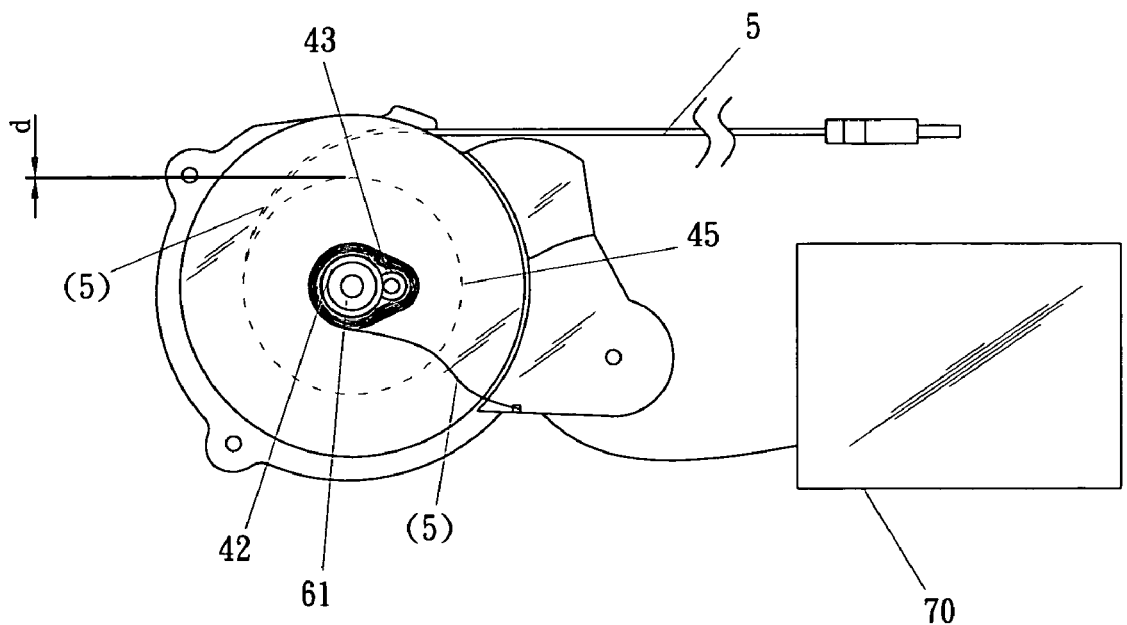
FIG. 9D is a fourth schematic drawing of the mouse cable rewind apparatus of the invention, showing how the pulling force on the cable is counteracted.

In unwinding the cable 5, as shown in FIGS. 3A, 7A, 7B and 7C, the upper and lower winding disc 3, 4 rotate on the rotating shaft 61. Meanwhile, the engaging protrusion 175 is driven out of the engaging grooves 331. As the pulling force is greater than the restoring force of the resilient pieces 172, 173, the cable 5 can be continuously unwound at a desired length. After that, the pulling force disappears and the resilient piece 172 springs back for engaging into the engaging groove 331. In rewinding the cable 5, as shown in FIGS. 7D and 7E, you need only to move the cable 5 to and fro with little effort for disengaging it from the engaging grooves 331. In addition, the cable 5 is rewound by the restoring force of the spring 35. In rewinding and unwinding the cable 5, the movement of the tooth seat 66 and the regulating member 17 is controlled by engaging the lower blade teeth 661 and the upper taper tooth 6611 into different tooth holes 174. In unwinding the cable 5, the regulating tube 171 rotates on the upright post 121 for compressing the insertion hook 1741 within the tooth hole 174 against the lower blade teeth 661. Then, it rotates on the positioning post 621 for a third of a circle to engage into the gap between the lower blade teeth 661 and the upper taper teeth 6611. At that time, the insertion hook 1742 is able to contact with the lower blade tooth 661. In rewinding the cable 5, the insertion hook 1742 is pressed against the lower blade tooth 661, and it rotates on the positioning post 621 for a third of a circle to engage into the gap between the lower blade teeth 661 and the upper taper tooth 6611. In this way, the regulating member 17 can be regulated by the tooth seat 66 for setting the upper and lower winding disc 3, 4 in operation.

As shown in FIGS. 9A, 9B, 9C and 9D, the cable 5 is wound around the semicircular protrusion 43 and the round tube 42 for one circle first. We assume that the ratio of its external diameter to that of the lower protrusion ring 45 is 1:2. Before the cable 5 is unwound, it is wound around the lower protrusion ring 45. Moreover, the cable 5 has a section thickness of α. The section thickness α will be reduced to α/2 by unwinding the cable 5. In this way, the cable 5 wound around the semicircular protrusion 43 and the round tube 42 is gradually loosened. Assume α/2=b. When the cable 5 is continuously unwound to have a section thickness smaller than b, the cable 5 wound around the semicircular protrusion 43 and the round tube 42 will be gradually rewound in opposite direction. When the cable 5 is completely unwound, the section thickness will be reduced to 0 (that is d). Therefore, the end portion of the cable 5 can undergo an effective and repeated rotating and winding action for counteracting the pulling force on the cable end and the circuit board during the rapid rewinding action. So, the fact that the strands inside of the conventional mouse cable is subject to break due to the oxidation of the cable sheathing and the frequent and rapid pull-out of the cable can be avoided.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A mouse cable rewind apparatus comprising:
a) an upper cover formed in concave oval shape and having at its rear side a receiving groove with a single opening, a shaft socket being disposed at the center of the receiving groove, an engaging groove being formed at the opening of the receiving groove while a tube-shaped regulating seat is slightly spaced apart from the engaging slot, the rear semicircular wall of the regulating seat extending upwards, thereby forming two counteracting parts at its both sides, respectively, an upright post being disposed at the center of the semicircular wall of the regulating seat so as to allow the attachment of a regulating member with its regulating tube to the regulating seat, the regulating member is a hook body and having two resilient pieces disposed on both sides of the basis of the regulating tube, the center of the regulating member being bored with an oval tooth hole having two raised insertion hooks at both sides thereof, an engaging protrusion extending forwards from the front part of the regulating member;
b) a support plate having a rotating shaft standing uprightly at the center thereof, a laying plate being raised at a predetermined height from one side of the support plate and converging in radial direction into a semicircular end, the laying plate having a positioning post at the center thereof so as to allow the attachment of a tooth seat to the laying plate and further having a regulating hole near the positioning post, a laying base with a semicircular spring post being raised at a higher place than the laying plate, the tooth seat being formed as a cylindrical body and having six evenly spaced lower blade teeth on which three evenly spaced upper taper teeth lie, the tooth seat being bored with a tooth seat hole at the center of the bottom thereof;
c) an upper winding disc having an upper protrusion ring concentrically positioned on the surface thereof, a spring hole being formed in the wall of the upper protrusion ring, the flat surface of the upper winding disc being bored with a shaft hole within the upper protrusion ring, the upper winding disc further having two opposing engaging grooves at the rim of the flat surface thereof, an insertion protrusion being positioned on the reverse side of the upper winding disc and near the shaft hole of the flat surface so that a spring with its hook end is able to be hooked into the spring hole and, after being wound around the upper protrusion ring, the remaining spring is fitted over the spring post of the support plate;
d) a lower winding disc having a round tube extending upwardly from the center of a flat surface thereof, the round tube having a shaft hole that is extended into the flat surface a semicircular protrusion with an insertion hole at the center thereof being fitted at the rim of the round tube, the lower winding disc further having a lower protrusion ring and a cable inserting gap on the back side thereof, a cable clamping groove being formed within the lower protrusion ring; and
e) a lower cover attached to the upper cover for creating an isolation room;

whereby the upper winding disc with its shaft hole is attached downwardly onto the round tube of the lower winding disc so as to allow the insertion of the insertion protrusion of the upper winding disc into the insertion hole of the semicircular protrusion, thereby fixing the upper and lower winding discs in place; thereafter, a signal cable extends through the cable inserting gap of the lower winding disc over a certain length with one end fixed on the semicircular protrusion of the lower winding disc for winding around the round tube and the semicircular protrusion and then being spot-welded to a circuit board and with the other end clamped into the cable clamping groove for winding around the lower protrusion ring so that the assembly of the upper and lower winding discs is then mounted on the rotating shaft of the support plate; meanwhile, both inserting hooks of the regulating member of the upper cover are engaged just into the upper taper teeth of the tooth seat so that a convenient use is achieved by means of the resilience of the spring and the regulation between the regulating member and the tooth seat.

2. The mouse cable rewind apparatus of claim 1 wherein a protection disc is fitted between the upper winding disc and includes a shaft hole at the center thereof for mounting the protection disc onto the rotating shaft of the support plate and wherein the protection disc lies on the upper winding disc for preventing its components from scatteration.

3. The mouse cable rewind apparatus of claim 1 wherein an end stop is located at the place where the semicircular wall of the regulating seat leads into the opening, and wherein, at the same side of the end stop, a partition is provided in the front part of the upper cover, and wherein the partition is separated from the end stop by an engaging slot, and wherein an elongated groove is formed between the partition and the side wall of the upper cover, and wherein two engaging pieces are insertable into the engaging slots, respectively, for receiving the cable head.

4. The mouse cable rewind apparatus of claim 1 wherein a sleeve is so constructed that it can be mounted between the spring post and the spring for reducing the wearing action on the spring.

5. The mouse cable rewind apparatus of claim 1, wherein a plurality of evenly spaced engagement pieces are extended from the outer rim of the support plate for engaging into the engaging groove of the upper cover in place.

* * * * *